(No Model.)
C. H. LOEW.
FILTER.
No. 578,574. Patented Mar. 9, 1897.
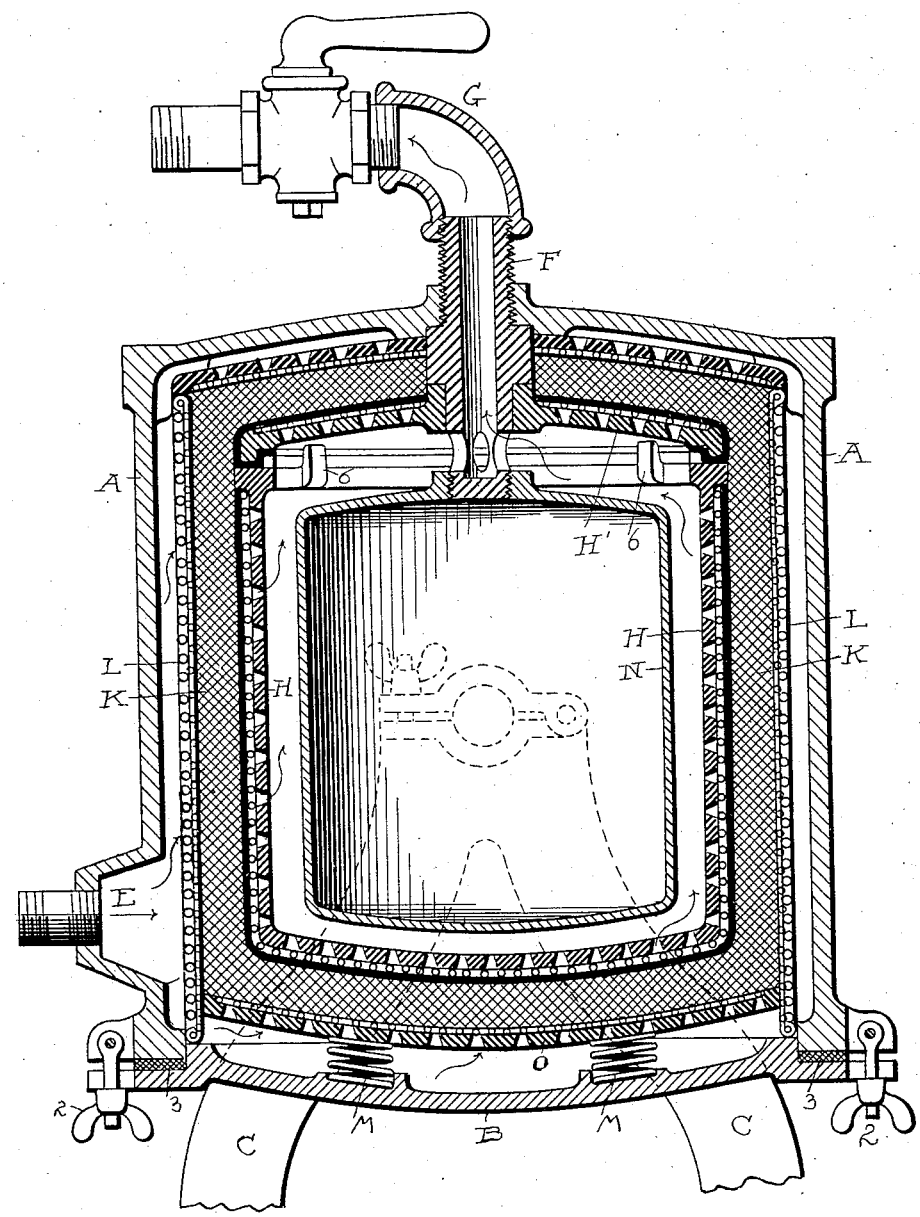
ATTEST
R. B. Moser
H. E. Mudra
INVENTOR.
Charles H. Loew
By H. J. Fisher Att'y

UNITED STATES PATENT OFFICE.

CHARLES H. LOEW, OF CLEVELAND, OHIO.

FILTER.

SPECIFICATION forming part of Letters Patent No. 578,574, dated March 9, 1897.

Application filed May 9, 1896. Serial No. 590,957. (No model.)

*To all whom it may concern:*

Be it known that I, CHARLES H. LOEW, a citizen of the United States, residing at Cleveland, in the county of Cuyahoga and State of Ohio, have invented certain new and useful Improvements in Filters; and I do hereby declare that the following is a full, clear, and exact description of the invention, which will enable others skilled in the art to which it appertains to make and use the same.

My invention relates to improvements in filters; and the invention is designed more particularly for beer-filters, all substantially as shown and described, and particularly pointed out in the claims.

I have discovered after a series of practical tests carefully made by myself that whenever the slightest portion of air or gas accumulates in the process of filtering beer there is set up a tendency therein to produce more gas. The accumulation of gas causes foaming, which is objectionable, and hence there should be provision made in an apparatus of this kind either to prevent accumulation of gas or foaming or to relieve the accumulation by suitable traps to carry off the gas, as is usually done in beer-filters.

My present invention therefore is intended to prevent, as far as possible, the generation of gas during the process of filtering, and in the event that gas is developed to retain the same to the beer and to carry it directly away with the beer instead of permitting accumulation. To further this purpose, it is necessary to keep the beer as nearly as possible under uniform pressure at all points and under such pressure as will prevent the liberation of gas, and in the second place, if a slight portion of gas be developed, to cause it to travel away with the beer and be absorbed thereby instead of providing a place for its detention and removal.

In the accompanying drawing the illustration shows a vertical central sectional elevation of an improved filtering apparatus embodying my invention.

A represents the cylinder or casing, and in the view as here shown the apparatus is in working position. If the apparatus is to be taken down for cleaning or to be furnished with a new supply of pulp, it is inverted, the present bottom then becoming the top and the top thereof the bottom of the apparatus. To effect this change, the pipe connections are temporarily detached. As here shown, the cylinder A is made in one piece, excepting its bottom B, which is secured thereon by means of bolts and thumb-nuts 2, pivoted to ears on the cylinder A, but obviously other means which will serve the same purpose may be employed, and a suitable packing 3 makes a close joint between the body A and the bottom B. The cylinder A further is provided with trunnions at its side, which rest upon the frame C and upon which the cylinder is freely tilted, as above indicated, so that inversion of the cylinder is easy and convenient. The inlet to cylinder A is shown at E near its bottom and the outlet through the coupling F at its top, suitable pipe connections G extending thence from F to the place of delivery for the beer.

The inside of the cylinder A is equipped with the filtering means and consists, primarily, of a large perforated or open-work chamber H, which is shown here as occupying the larger part of the inside of cylinder A and about which is packed the wood-pulp or other sufficient filtering medium K. The chamber H is inclosed about its perforated sides and ends with wire-gauze and canvas covering, as heretofore, and confining the pulp about its outside is the perforated or open-work wall L, which extends entirely around within the chamber at some distance from the wall thereon and in such relation as to permit a space for the unfiltered liquid all around and at the ends between the wall of the chamber proper and the inner wall L. The liquid which enters through pipe E thus distributes itself in its unfiltered condition into this jacket or space between said walls and works its way uniformly in through the filtering medium to the chamber within, whence it is discharged through the coupling F.

It will be noticed that the chamber H has much exposure of area for the filtering medium packed about it, so that it has the advantage of a very large filtering capacity and renders it possible for me to filter beer much more rapidly than I could if the area of the chamber H were much reduced; but in a filter of this kind it is desirable that there should be no stagnant liquid at any point, and that the liquid which is filtered should be carried as fully as possible out of the apparatus, thus also avoiding waste or loss when the filter is to be cleansed. To this end I provide the said chamber H with a displacement medium N, shown here as a hollow part threaded onto the coupling F, and of course hermetically closed, so as to prevent liquid entering therein. This part may be either hollow or solid, but it preferably is made hollow and of such firmness as to withstand all pressure, and is intended to reduce the amount of liquid which accumulates in the chamber H nearly to the minimum, and so that in no event will there be any considerable accumulation standing therein. Hence when the apparatus is to be cleansed and the liquid drawn off there will be little waste from the chamber H. The said chamber H is made in two parts, having a cover H' sleeved on the coupling F. This part H', however, is the bottom part when the cylinder is reversed and the parts are put together, and lugs 6 on the part H overlap the edge of said cover and hold the parts in working relation at that point. The displacement member N can be unscrewed from its support and the parts H and H' be removed when the change of pulp or other cleansing of the apparatus is required, and all the parts are restored to place while the apparatus is in inverted position. Then in order that the pulp may be closely packed, as may be required, and held in place, and that all the parts may be sustained in their proper relation, I have shown springs M interposed between the bottom O of the filtering-wall L and the bottom B of the cylinder. This bottom O is of the nature of a perforated plate serving as a follower, and the springs M bear against the same and exert a sufficient tension not only to maintain compactness of the pulp about the cylinder H, but also to sustain the otherwise free parts in proper working position. As many of these springs may be interposed between the bottoms B and O as may be necessary, and they may have any requisite tension. In lieu of the springs a tightening-screw might be used.

Now it will be noticed that in this apparatus no provision whatever is made for accumulating or trapping gas, and none need be made, because there is no place at which gas is generated and none where it can be accumulated. The liquid enters the filter under pressure through the opening E, and since the pressure continues all about the inside of the cylinder alike and from all points uniformly to and through the chamber H it will be seen that there is no place outside of said chamber in said cylinder where there is any lack of pressure or where gas can be liberated. Then when the small space within the chamber H is filled with liquid, which occurs very quickly, there is no place for the accumulation of gas therein, because the very nature of the construction and arrangement of parts keeps the said chamber full of liquid under some measure of pressure at all times, and should there be any development of gas at any point between the entrance of the beer at E and its discharge at F it would not only naturally rise to the top, but it would be forced out with the beer through the said coupling and pipe.

What I claim as new, and desire to secure by Letters Patent, is—

1. The filter described comprising the rotatable main casing and the tubular coupling forming a liquid-passage projected into one end and center of said casing and provided with lateral passages near its inner end, in combination with chamber H forming an open-work internal wall and engaged about said coupling above said passages, and a hermetically-sealed displacement member suspended from said coupling beneath said passages, substantially as described.

2. The casing A having trunnions, the chamber H within the same and the coupling F connecting said parts and having lateral inlet-passages within said chamber and closed at its lower end, in combination with the displacement member N suspended from said coupling below said passages, the said coupling F terminating within the said part H and means to support the part H in operative position, substantially as described.

3. The filter described consisting of the outer cylindrical casing having trunnions, the tubular coupling set centrally into one end of the casing and having side inlet-passages within the casing and closed at its inner end, in combination with the chamber H having a cover H' engaged centrally about said coupling, the packing round about the outside of the said parts H and H', the follower O and the supporting parts M at the bottom and the removable end B of the casing, said parts constructed and arranged substantially as described.

4. The combination with the main casing of the filter having trunnions at its sides, the coupling F entering the casing at one end and the cover B secured to the other end, the internal chamber H and the separate end part H' thereof engaged on said coupling, the displacement member N within said chamber and threaded on the end of said coupling F, the filtering material packed about the outside of the chamber H, the follower O and the supports M interposed between said follower and the cover B of the main casing, substantially as described.

5. The filter described comprising the outer casing A closed at one end and the temporarily-attached cover B at the other end, and the tubular coupling F entering the closed end of the casing, in combination with the interior chamber H and the separate cover H' therefor sleeved onto the inner end of the coupling F, the internal wall L between the casing and chamber H and the packing of filtering material between said wall L and chamber H, H', the follower O and the parts M interposed between said follower and the cover B, substantially as described.

Witness my hand to the foregoing specification.

CHARLES H. LOEW.

Witnesses:
H. T. FISCHER,
R. B. MOSER.